THERMOELECTRIC CONVERTERS AND METHOD OF MAKING SAME

Filed June 16, 1969 2 Sheets-Sheet 1

INVENTORS
Robert T. Luedeman
Walter A. Troeger

BY [signature]

ATTORNEY

United States Patent Office
3,690,955
Patented Sept. 12, 1972

3,690,955

THERMOELECTRIC CONVERTERS AND METHOD OF MAKING SAME

Robert T. Luedeman, Metuchen, and Walter Alvin Troeger, Berkeley Heights, N.J., assignors to Weston Instruments Division, Newark, N.J.

Filed June 16, 1969, Ser. No. 834,936
Int. Cl. H01v 1/02
U.S. Cl. 136—226 10 Claims

ABSTRACT OF THE DISCLOSURE

A thermoelectric converter employs two rods fixedly joined in juxtaposed relationship by a mounting located between different ends of the rods so that portions of both rods extend from the surface of the mounting. A coil formed with at least one, and typically a multiplicity of hot and cold thermocouple junctions is wound about rod end portions extending from the surface of the mounting, the cold junctions being in thermal contact with one of these end portions. The rods are electrically insulated from the coil and have both good thermal conductivity and rigidity. The other end portions extending from the mounting may be thermally coupled to a heat sink so that the temperatures of the cold junctions are maintained constant and low relative to their corresponding hot junctions. In addition to serving as rigid coil supports and heat sinks for the cold junctions, the rods may be laterally displaced prior to being fixedly joined by the mounting to alter the spacing between hot and cold junctions and correspondingly the converter transfer gain. Electrical access to the coil, and particularly to the coil ends, may be made by way of elongated terminal pins fixed on the mounting in a manner similar to that of the rods. Thermal isolation between pins is achievable by appropriately positioning the pins relative to the rods. Enclosure of the coil may be effected by joining a suitable housing to the mounting with a hermetic enclosure evacuated to obtain maximum level of electrical output being specifically contemplated.

Also disclosed is a method of making the aforedescribed converter which includes removing discrete portions of coatings from a conductor wound on the suitably spaced rods and initially fully coated with a material of dissimilar thermoelectric properties to obtain the desired lengths of hot and cold thermocouple junctions.

This invention relates generally to thermoelectric devices and more particularly to multijunction thermoelectric converters and a method of making same.

Thermoelectric converters are commonly used to convert a thermal or electrical current input into an electrical potential output. Such converters employ either a single thermocouple junction or a multiplicity thereof. Those converters using a multiplicity of thermocouple junctions employ the latter in tandem, thus in form of a chain of junctions and generally with their electrical polarities in alternation so that their total electrical output voltage is the sum of their individual outputs. Some converters of this type employ such a chain of thermocouple junctions helically wound upon and electrically insulated from a supporting member to form a compact coil of thermocouples with sufficient lateral separation between adjacent coil convolutions to prevent electrical short circuits. A convenient means of forming the thermocouple junctions for the aforementioned arrangement in tandem is that of coating discrete lengths of a bare metal conductor of relatively low electrical conductivity, such as constantan, with a thermoelectrically different metal of relatively high electrical conductivity, such as silver or copper. Those lengths of the conductor which remain bare then constitute one element of a thermocouple, while those lengths which are coated form the other. Although the core of the coated length is metallically identical to the bare conductor, the length of thermoelectrically dissimilar metal of higher electrical conductivity creates a junction between bare and covered sections possessing the characteristics of a thermocouple junction. Each set of junctions might then be said to be formed by a length of bare metal conductor at least partially coated at each end. If the ends are maintained at the same relatively low temperature such as ambient temperature by, for example, thermally coupling both ends, singly or jointly, to a common heat absorbing element, a first "cold" junction can be defined at the interface between a first coated section and the end of the bare wire extending therefrom, while a second "cold" junction can be defined as being located along the opposite, second coated length or section. Between these cold junctions is the remaining interface between the bare wire and the second coated section. This remaining interface can be heated to a temperature above that of the remote ends in which case it becomes a "hot" junction.

In a multijunction thermoconverter the hot junctions are typically aligned in a row parallel to the longitudinal axis of the coil so as to conveniently receive heat from some suitable source of thermal energy, such as a heater wire or a movable light beam.

If the amount of heat supplied to the hot junctions remains constant and all other pertinent factors remain the same, an increase in the length of the thermal circuit, that is, in the total distance between a hot junction and each of its corresponding cold junctions taken along the length of the coil results in a proportional increase in the thermal impedance of the circuit. Hence, an increase in the distance between the hot and cold junction results in a proportional decrease in thermal conductivity between the various junctions which, in turn, causes an increase in the steady state temperature differences between hot and cold junctions. Since the electrical potential developed by the hot and cold junctions is substantially proportional to their temperature differences, it is possible to vary the transfer function, and importantly, the transfer gain, between the thermal or electrical input signal and the electrical output potential by changing the distances between the hot and cold junctions. Whereas, this expedient may be used to advantage to provide optimum converter conformance to some particular thermal input-electrical output requirement or range of requirements, known prior art converters do not possess sufficient versatility to fully utilize this expedient without undergoing major structural changes, particularly in the structures of members employed to support the coils.

Further, for certain industrial applications, particularly in those instances where it is desired to convert the heating effect (or RMS value) of a time-varying electrical current into a representative D.C. potential, the hot junctions are heated by a conductor of known, stable resistance value to which the time-varying current is applied. Other similar applications require that the converter have a differential mode of operation made possible by employing two groups of voltage-opposing hot junctions connected in electrical series circuit, each group being heated via an electrical conductor of known resistance value by a different time-varying current applied to the conductor. The resulting D.C. difference potential between the two groups of hot junctions appears across the terminal ends of the coil. To effect such conversions with a minimum of internally generated errors engendered by thermal conductions between the various current-carrying conductors utilized by the converter, the conductors and the terminal ends thereof should be thermally isolated from one another, at least to some extent.

Finally, the converter should be capable of providing the desired transfer function with good accuracy, sensitivity and stability and yet be inexpensively mass-producible. One of the main disadvantages of the known prior art is that the construction of devices having these characteristics at best involves relatively tedious and time-consuming processes.

It is an object of this invention to provide a new and improved thermoelectric device.

Another object of this invention is to provide a multijunction thermoelectric converter apparatus and a method of making such apparatus wherein versatility of conformance to different transfer functions and specifically different transfer gains is readily obtainable.

A further object is a thermoelectric converter comprised of a plurality of thermocouple junctions, which may be readily and easily modified to satisfy various input-output requirements through variation in the separation between hot and cold thermocouple junctions.

Another object is to provide a multijunction thermoelectric converter which is essentially insensitive to ambient thermals and effects at least some degree of thermal isolation between different converter electrical terminal elements.

A further object of this invention is to provide a multijunction thermoelectric converter having two thermally-isolated groups of thermocouple junctions and thermally isolated electrical conductors coupled thereto.

BRIEF DESCRIPTION OF INSTANT INVENTION

The instant thermoelectric converter includes a helical coil formed by a plurality of discrete sections of dissimilar thermoelectric material joined in tandem. Hot and cold thermocouple junctions are formed at different ends of each section, the hot junctions receiving heat from any suitable thermal source. The coil is electrically insulatively supported interiorly thereof by coextensive portions of two essentially parallel and essentially identical rods having both good thermal conductivity and resistance to bending, the hot and cold junctions being arranged in different respective rows extending substantially parallel to the longitudinal axes of the rods with the cold junctions in direct thermal contact with the rods. The rods are fixedly mounted together between the ends thereof by a base member such that portions of the rods opposite the coil-supporting portions thereof may be thermally coupled to a heat sink whereby a relatively low, substantially uniform temperature between the various cold junctions is maintained.

Advantageously, the instant invention may be readily adapted to provide transfer functions, and especially transfer gains, which best conform to particular design requirements. This is obtained by having the rods laterally displaceable relative to one another prior to fixation through hardening of the base member and moreover by forming the thermocouples after the rods are thusly positioned. In regard to these facets of the invention once the desired spacing between the rods is determined, the base member is permitted to harden and thereby fix the relative positions of the rods. Portions of the rigidly mounted rods extending from one surface of the base member are wound helically with a wire of sufficient length to form the desired number of thermocouples of the wire being coated essentially along the entire length thereof with a metal of suitably dissimilar thermoelectric properties. Discrete portions or lengths of the coated conductor are then removed, for instance, by etching, to provide the desired lengths of bare conductor and hence the desired spacing between the resulting hot and cold junctions. As discussed hereinabove, the distance taken along the coil convolutions between the hot and cold junctions is a parameter which determines the magnitude of the potential produced across the junction for a given amount of heat applied to the hot junction and thus determines the transfer gain of the converter.

Further, the various conductors utilized by the converter, such as the leads connected to the different ends of the coil, and the input leads of heaters joined to the hot junctions may also be mounted on the base member and variously positioned relative to the two rods to obtain various degrees of thermal isolation since the rods are considerably larger in size than the leads, are good thermal conductors and may be maintained at a substantially constant temperature by way of thermal coupling to a heat sink.

The base member, in addition to fixedly mounting the rods and various other electrical leads, may also be employed to form part of a hermetic envelope enclosing at least the coil and the corresponding coil-supporting portions of the rods. The envelope, which may be a transparent glass bulb, affords protection and good isolation of the thermocouple junctions from deleterious ambient conditions, such as direct contact with other apparatus and/or ambient convection currents. Moreover, the envelope provides a hermetic chamber which may be evacuated of air to reduce heat transfers created by thermal convections between junctions and thereby increase the maximum level of the signal output obtainable from the converter.

Moreover, in accordance with the method of this invention, a thermoelectric converter having high adaptability of conformance to various transfer gain requirements, high sensitivity and good thermal stability and accuracy may be manufactured at relatively low cost.

For a better understanding of the present invention, together with other and further objects thereof, reference may be had to the following description taken in connection with the accompanying drawings, the scope of the invention being pointed out in the appended claims.

Referring to the drawings.

DETAILED DESCRIPTION OF INSTANT INVENTION

Figure 1:
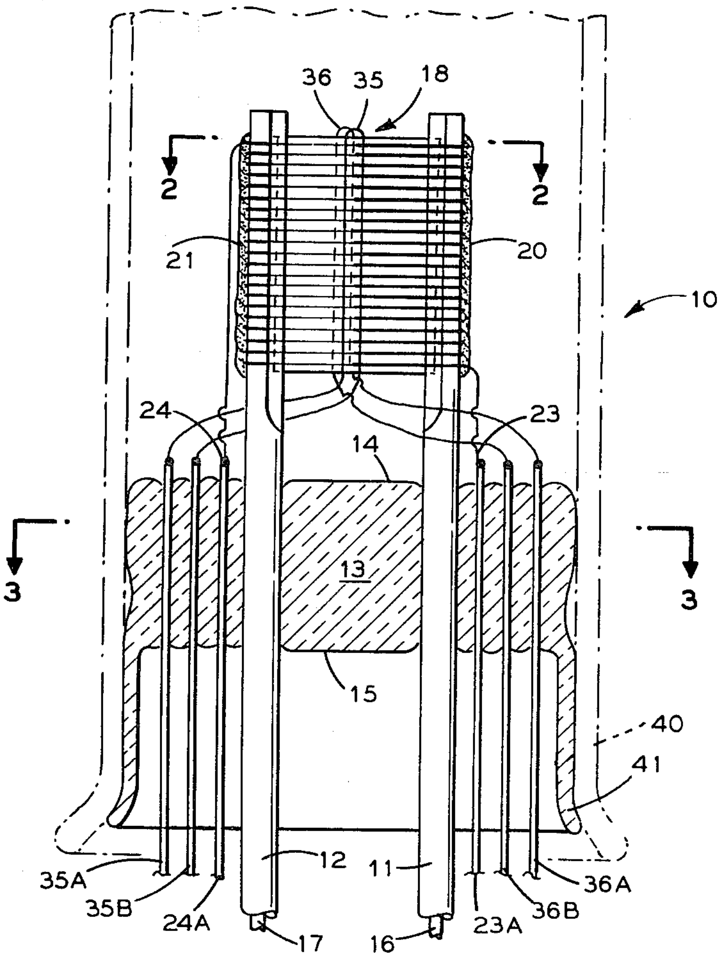
FIG. 1 is a side sectional view of one embodiment of a multijunction thermoconverter constructed in accordance with this invention.

FIG. 1 illustrates one embodiment of a thermoelectric converter 10 constructed in accordance with this invention. Basic to the converter are two rigid and typically coextensive rods 11 and 12 fixedly mounted in substantially parallel relationship by a base 13. Preferably the base 13 is composed of an electrical insulative material such as glass, and has two longitudinally opposed surfaces, 14 and 15 from which different portions and ends of rods 11 and 12 extend. The rods may be firmly and hermetically sealed to the base 13 by, for example, pinching the base tightly around the suitably spaced apart and clamped rods while the base is in a molten or moldable state and then allowing the base to cool and/or solidify to form a rigid, airtight mounting for the rods.

In order to provide paths of good thermal conduction from between various of the cold junctions so that the cold junctions are maintained at a known, constant, and preferably equal temperature, each rod 11 and 12 may be cored by a material having less rigidity against longitudinal bending but higher thermal conductivity and flexibility for ease of thermal coupling to a common heat sink. To this end, the rods 11 and 12 may be formed from highly rigid metal cylinders composed, for example, of NiFe, having good thermal conductivity and importantly a high resistance against bending about the longitudinal axes thereof. Each cylinder is bored concentrically throughout the length thereof to receive with a tight or interference fit a cylindrical core insert composed of a material, such as copper, having a higher thermal conductivity, but perhaps a greater flexibility than the encasing rods. The cores inserted in the rods 11 and 12 are designated in FIGS. 1 and 2 by the numerals 16 and 17, respectively, and may be thermally coupled, as by soldering or welding, to a suitable heat sink or heat sinks (not shown) such as the metal chassis or housing of the equipment utilizing the converter 10.

Figure 2:
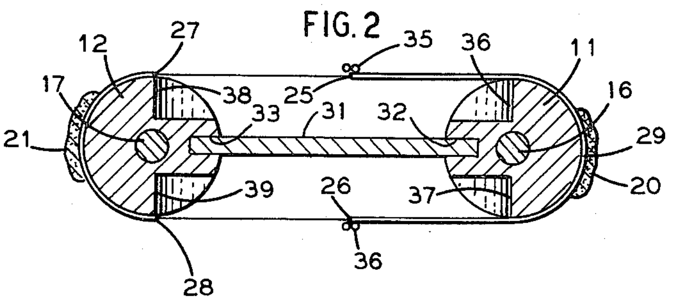
FIG. 2 is an enlarged sectional view taken along lines 2—2 of FIG. 1.

In FIGS. 1 and 2 numeral 18 designates a helical coil formed of a multiplicity of successive hot and cold thermocouple junctions. The coil 18 is wound upon and thereby internally supported by the portions of the rods 11 and 12 which project from the surface 14. To provide good electrical insulation between the rods 11 and 12 and the thermocouple junctions at least the coil-supporting portions of the rods 11 and 12 are coated with a thin layer of electrical insulating material having good thermal conductivity, such as glass. The lateral spacing between the rods 11 and 12 may be varied prior to final solidification of the base 13 so as to conform with the desired transfer characteristics of the converter.

As discussed hereinabove, if a constant amount of heat is applied to the hot junction and if the temperature of the corresponding cold junctions are maintained essentially constant, an increase in the lineal spacing or separation along the convolutions of the coil between the hot and the two cold junctions causes an increase in the magnitude of the potential difference between the hot and cold junctions. Conversely, a corresponding decrease in potential is realized by having the hot junction closer to a corresponding one of the cold junctions.

Variations in the separation between hot and cold junctions to provide optimum converter conformance to some desired empirical thermal input and electrical output requirement is made possible without requiring major structural changes in the coil support member. This is accomplished by forming the coil-support member initially as two individual rods 11 and 12 which may be initially displaceable toward or away from one another until the corresponding cold junction-hot junction-cold junction length is obtained. Once this length is obtained for the thermocouple junctions, the rods are tightly clamped in a fixture to preclude any further displacement thereof and the base 13 is applied in molten form and then allowed to solidify and maintain the separated rods the desired distance apart. After the rods 11 and 12 are thusly fixed, the coil-supporting rod portions extending from one surface of the base 13, specifically, the surface 14, may be coated with a thin layer of an electrically insulative material having good thermal conductivity, such as molten glass. When this insulative coating hardens or while still tacky, a fully coated wire of sufficient length to provide the requisite number of thermocouple junctions with the desired length between different hot and cold junctions is wound firmly upon these portions of the rods.

The winding of the coated wire on the rods may be easily effected by rotating the rods about a longitudinal axis of symmetry located midway between the rods and traversing the rotating rods with the coated wire to obtain insulating separation between the coil convolutions. The coil convolutions may be firmly secured to the rods 11 and 12 by applying a suitable electrically insulative adhesive to sections of the wire in contact with the rods 11 and 12 which are to remain coated, or alternatively the hardening of the insulative coating on the rods may serve to secure portions of the coil convolutions embedded therein. FIG. 1 depicts the case wherein adhesive coatings 20 and 21 are applied to the coated wire sections to secure the wire convolutions to the rods 11 and 12.

The formation of the coil 18 follows in sequence the mounting of the fully coated conductor on the rods 11 and 12 and involves removing equal discrete lengths of the outer coating of higher conductivity, preferably by photo-etching, to form the desired discrete, equal lengths of bare conductor and consequently, two parallel rows of hot and cold junctions. The row or rows of hot junctions lie in a plane located between the rods 11 and 12 perpendicular to a plane containing the longitudinal axes of the rods, the exact location of this plane relative to the rod 12 being determined by factors such as obtaining the desired balance between the maximum tolerably heat loss in a representative thermocouple and the maximum tolerable electrical resistance of that thermocouple. As is known to those working in this art, other considerations may additionally or solely determine the optimum location of the row of hot junction between the rods 11 and 12.

The illustrated embodiment of the instant invention may be used to measure or compare differences between the means square values of two time-varying electrical signals in which case conformance to the well-known square-law characteristic is important. A specific application of this principle is the measurement of electrical power. Since two input electrical signals are implicit, the converter correspondingly employs two rows of thermocouples series-connected in polarity opposition. Connected to all hot junctions of one row is a heater wire of known resistance value, the two heater wires typically having the same resistance and acting as sources of thermal energy to different ones of the two rows of hot junctions when the time-varying electrical signals in the form of electrical currents are applied thereto. The resulting D.C. difference potential appears across the two output terminals of the coil 18, designated 23 and 24, respectively, in FIG. 1. Manifestly, the number of thermocouple junctions determine the electrical transfer gain or amplification of the converter.

Since the two rows of hot junctions are usually located relatively close to one another, it is often preferred to thermally isolate one row from the other and thereby minimize conversion errors attributable to thermal radiation therebetween. As described subsequently, the illustrated embodiment provides a converter suitable for operation in a differential mode wherein thermal isolation between two rows of hot junctions may be readily obtained. It will be appreciated, however, that the instant converter finds utility in other and different applications requiring, for instance, a single row of hot junctions and a different source of thermal energy for variously applying heat to one or more of these junctions.

As illustrated in FIGS. 1 and 2, a row of hot junctions is formed on one side of the rods 11 and 12 by a multiplicity of longitudinally aligned hot junctions, similar to the hot junction 25, and perpendicular thereto and on an opposite side of the rods a second row of hot junctions is formed by a multiplicity of longitudinally aligned hot junctions, similar to the hot junction 26. A cold junction associated with the hot junction 25 is indicated at 27 and a cold junction associated with the hot junction 26 is indicated at 28. The two other cold junctions for the hot junctions 25 and 26 are effectively a single, common junction which may be visualized as being located at 29, that is, essentially halfway between the ends of the coated section forming both series voltage-opposed hot junctions 25 and 26.

Thermal isolation between the two rows of hot junctions 25 and 26 is obtainable by utilizing a thin, rectangular plate 31 formed of a suitable thermal insulating material, such as a ceramic. The plate 31 may be mounted with an interference fit in diametrically opposed slots 32 and 33 of substantially U cross-section formed in the innermost surfaces of the rods 11 and 12, respectively, the slots extending the entire axial length of the coil 18 to the extremities of the free ends of the rods, so as to permit insertion of the plate 31 into the coil interior. The slots 32 and 33 may be milled or otherwise recessed deep enough so that the two parallel side walls defining each slot will contain the edges of the plate 31 inserted therebetween even though the separation between the rods 11 and 12 may have been varied to some extent for the reasons discussed hereinabove and subsequently.

Each of the two rows of the hot junctions 25 and 26 is depicted as being joined by a single, continuous length of bare conductor or heater, of overall U-shape to provide a current return path, the heater 35 traversing the row of junctions 25 and the heater 36 traversing the row of junctions 26. The heaters 35 and 36 are typically equal-diametered Nichrome wires connected to terminal pins 35A, 35B and 36A, 36B, respectively, to receive different electrical currents under magnitude comparison. Similarly the leads 23 and 24 of the coil are connected to output terminal pins 23A and 24A, respectively, from which the different voltage outputs may be taken and utilized. Any suitable electrically insulative adhesive may be used to join each of the various hot junctions to the heaters. The terminal pins 35A, 35B and 36A, 36B as well as the terminal pins 23A and 24A may be held by suitable means, such as a disc apertured to mount the pins and the rods 11 and 12 in various desired positional relationships and orientations relative to each other and the rods so that when the base 13 bonds the pins and rods together, end portions of both extend from the base surfaces 14 and 15. After the pins are attached to the base 13, electrical connections to the different coil leads and heaters may be made by soldering.

Figure 4:
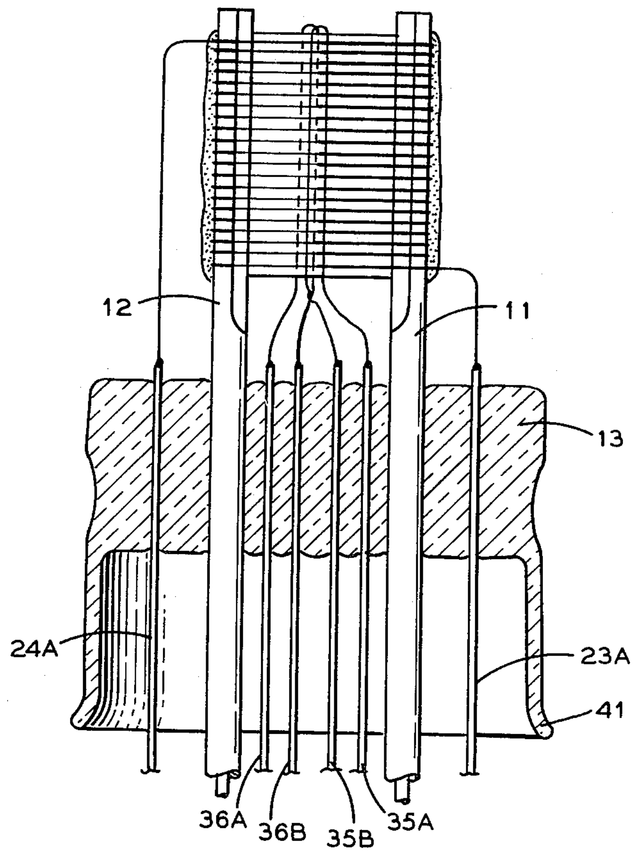
FIG. 4 is another embodiment of the instant invention which provides a relatively high degree of thermal isolation between various heat-radiating conductors supplying electrical signals to, or receiving such signals from a coil of thermocouples.
Figure 3:
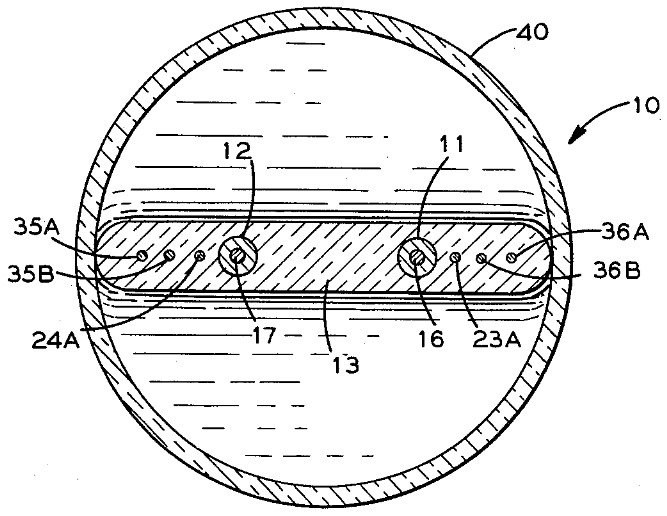
FIG. 3 is an enlarged sectional view taken along lines 3—3 of FIG. 1.

In the arrangement illustrated in FIG. 1 and with the considerably larger sized rods 11 and 12 thermally coupled to a heat sink, the rods will be at some relatively constant "low" temperature and by virtue of their relatively large size, will act as substantial heat sinks to heat radiated from the terminal pins and especially closely adjacent pins 23A and 24A. If desired, a greater degree of thermal isolation may be provided between the heater pins 36A, 36B and 37A, 37B and the coil pins 23A and 24A by interposing the rods 11 and 12, respectively, between the former and latter groups of pins. This embodiment is depicted by FIG. 4 wherein like elements in FIG. 1 are similarly designated in FIG. 4. Thermal isolation between the two heater pins of each group similarly may be effected, and of course, the coil pins may be differently positioned relative to the heater pins and the rods. Possibly some adjustment in the lateral spacing between rods may be required to place the pins therebetween and manifestly this adjustment is possible to the extent the input-output requirements will tolerate such.

The provision for optimizing the spacing between hot and cold junctions may also be used to advantage in the aforedescribed dual-heater configuration. To illustrate, solely by increasing such distances corresponding and equal increases are realized in the amplitudes of both electrical output potentials. Hence, the comparison level and the resolution of amplitude differences is increased, which, in turn, makes possible a more accurate readout of the two input electrical signal amplitudes using currently available measuring equipment. Conversely, a decrease in such distances may be required to increase the speed of thermal response and with electrical input signals of high enough amplitudes and amplitude differentials accuracy of readout may not be materially affected.

Straight and sharply defined edges providing lines of reference for etching away the fully coated coil to form each row of junctions 25, 26, 27 and 28 are made available by milling or otherwise forming at least one, and usually two, flat surfaces 36, 37 and 38, 39 on the coil-supporting ends of the rods 11 and 12, respectively, the surfaces being coextensive with the coil 18, and being formed before the coil is wound on the rods. The slots 32 and 33 and these surfaces may be formed simultaneously by a single milling operation. On each rod the two surfaces may be coaligned with a rod center and if the rod surface in contact with coil convolutions is round, it is preferred that the interior or inwardly facing angle formed between the two surfaces be equal to, or greater than, 180 degrees in order to prevent the formation of small interior pockets between undersurfaces of the convolutions and the rounded surfaces of the rods diverging from such undersurfaces. Such pockets are undesired because of the possibility of their accumulating extraneous matter which may deleteriously affect the accuracy or performance of the converter. The surfaces 36, 37, and 38, 39 are oriented symmetrically relative to a plane taken midway between the rods 11 and 12 and may be thusly oriented by rotating one or both of the rods, as necessary, about the longitudinal axes thereof prior to solidification of the rods in the base 13.

The base 13 may be designed as the bottom closure for a hollow bulb, which when joined to the base, forms an envelope that encloses the mounted and electrically connected coil 18 and affords a degree of protection to the thermocouples and reduces heat losses attributable to ambient thermal currents. The bulb may be formed with a transparent window or be completely transparent to permit passage of radiant heat to the hot junctions. Moreover, the bulb may be hermetically sealed to the base and the envelope put under vacuum to withdraw air from its interior. Placing the coil under vacuum removes air which might otherwise create internal thermal currents and provide heat transfers between various ones of the thermocouple junctions and between the junctions and ambient temperature. Such heat transfers have the undesirable effect of reducing temperature differentials between hot and cold junctions and consequently, the maximum level of the electrical output signal obtainable from the converter.

To satisfy these ends, a thin-walled bulb 40 of a suitable material such as glass, may be inserted over the coil 18 after the latter has been wound on the rods 11 and 12 and the various coil and heater leads soldered to their corresponding pins. The bulb is then properly seated on and hermetically joined to the base by, for example, heat sealing the contacting glass surfaces together. Air may then be withdrawn from the interior of the thusly formed envelope through, for instance, an opening provided in an end of the bulb 40 opposite the base 13. Once the desired vacuum pressure is obtained, the opening is sealed off. Heat sealing the base 13 to the bulb 40 is facilitated by forming the bulb with a slightly flared open end and similarly forming the base with a mating flared rim 41.

If the flared rim of the bulb 40 is of circular cross-section, as specifically disclosed, the base 13 may be readily formed from a short, hollow cylinder of glass made molten by heating and, while molten, passed over the ends of and then pinched tightly around the clamped rods 11 and 12 and the similarly clamped electrical pins to provide a hermetic seal between the rods and pins. The opposite end of the tube may then be heated and flared slightly to provide a seat, in the form of the rim 41, to finally receive the similarly flared end of the bulb 40.

The rods 11 and 12, although disclosed as having generally circular cross-sectional shapes, may have other shapes, especially rectangular or triangular. Typically, the rods and their internal and highly thermally conductive cores are of equal respective length in order that both ends provide substantially equal sinks to the cold junctions.

Manifestly, three or more rods such as 11 and 12 may be employed to support, for example, a greater number of thermocouples without necessitating an increase in the axial length of the coil.

The instant invention is particularly adaptive to mass production techniques. Practically identical parts for the various components such as the rods, coils, terminal pins, mounting bases and bulbs provide economies in manufacturing and inventory. Since the same parts are typically required to be assembled, cost reductions in this area are also realizable.

What is claimed is:

1. A thermoelectric converter comprising, a base having first and second surfaces, at least two elongated elements in juxtapositioned, spaced-apart relationship, having good thermal conductivity, each of said elements having two ends and said base fixedly mounting said elements in said relationship between the ends thereof so that different end portions of each element extend from each of said base surfaces, a conductor wound about coextensive lengths of said elements extending from the first base surface, so as to form a helical winding thereon, said winding being electrically insulated from said elements, a plurality of discrete, spaced-apart coatings along said conductor having thermoelectric properties dissimilar to said conductor, the junctions formed between coated and uncoated portions of said conductor helical winding defining at least one longitudinal row of thermocouple junctions spaced between said two elongated elements, the end portions of said elements extending from the second base surface conducting thermal energy received by the end portions of said elements extending from said first base surface.

2. A thermoelectric converter comprising: a conductor arranged in a helical coil having a longitudinal axis, a plurality of discrete coatings having thermoelectric properties dissimilar to said conductor spaced along said conductor so as to provide alternate coated and uncoated conductor portions, the junctions formed by said coated and uncoated portions of said conductor being substantially aligned in at least one row parallel to the longitudinal axis of said coil, a support member having two longitudinally spaced-apart surfaces, two elongated elements having good thermal conductivity mounted in substantially parallel relationship on said support member and having first and second portions extending, respectively, from different ones of said two surfaces of said support member, said first portions extending from one of said surfaces of said support member longitudinally into said coil and providing electrical insulative support to the coil convolutions, said one parallel row of junctions being spaced between the first portions of said elongated elements, and the second portions of said elements extending from the other of said surfaces of said support member for connection to a heat sink.

3. The converter as claimed in claim 2 wherein said support member is hermetically sealed to said elongated elements and which further comprises, an airtight enclosure for said first portions of said elements and said coil, said enclosure being hermetically mounted on said support member.

4. The converter as claimed in claim 2 wherein said alternate coated and uncoated conductor portions are aligned relative to the longitudinal axis of said coil so as to form two rows of thermoelectric junctions spaced apart in a direction perpendicular to said longitudinal axis of said coil an amount determined by the corresponding cross-sectional dimensions of said elements, and which further comprises, a flat plate mounted on said first portions of said elongated members and positioned between two rows of thermoelectric junctions for thermally insulating said two rows of junctions.

5. The converter as claimed in claim 2 wherein said two elongated elements comprises two rods having cores of high thermal conductivity and sufficient flexibility for connection to said heat sink.

6. The converter as claimed in claim 5 wherein outer surface portions of said rods contact the convolutions of said coil and wherein an inner surface portion of each rod has a longitudinal slot therein for receiving and mounting an edge portion of said plate, each slot extending at least the longitudinal length of said coil convolutions.

7. A thermoelectric converter comprising a wire conductor arranged in a helical coil and including a coating having thermoelectric properties dissimilar to said conductor and formed in a spaced array there-along so as to provide alternate coated and uncoated conductor portions, a support member having two spaced-apart end surfaces, two elongated elements having good thermal conductivity mounted in substantially parallel relationship on said support member and having first and second portions extending, respectively, from different ones of said two surfaces of said support member, said first portions extending from one of said surfaces of said support member longitudinally into said coil and providing electrical insulative support to the coil convolutions, the junctions formed between said coated and uncoated portions of said conductor being disposed between said elements substantially parallel to the longitudinal axes thereof, the second portions of said elements extending from the other of said surfaces of said support member for connection to a heat sink, at least one elongated electrical conductor having one section electrically connected to said coil, a second section of said conductor being mounted on said support member and extending from said other surface thereof so that further electrical connections may be made thereto.

8. The converter as claimed in claim 7 wherein said second section of said conductor is mounted on said member in juxtapositioned relationship to one of said elements.

9. The converter as claimed in claim 8 wherein said second section of said conductor is mounted between said elements.

10. A thermoelectric converter comprising, a wire conductor arranged in a helical coil configuration including a coating of dissimilar thermoelectric material and formed in spaced array along said conductor, so as to provide alternate coated and uncoated conductor portions and a junction formed at each end of each conductor portion, coil support means comprised of two rigid and essentially co-extensive rods mounted parallel to each other, each of said rods having good thermal conductivity and a first and second portion, the first portions of the rods extending longitudinally through said coil and electrically insulated therefrom, said first portions being spaced apart sufficiently to support laterally opposed convolutions of said coil with the junction intermediate the rods, mounting means for fixedly mounting said rods such that said first portions of said rods extends from one surface of said mounting means and second portions of said rods extend from an opposite surface of said mounting means, an envelope enclosing said first portions of said rods and said coil and joined to said mounting means, and plural electrical circuit means electrically coupled to said coil and having portions thereof mounted on said mounting means and extending from said other surface thereof.

(References on following page)

References Cited

UNITED STATES PATENTS

| | | | |
|---|---|---|---|
| 1,228,678 | 6/1917 | Johnson | 321—1.5 X |
| 1,726,182 | 8/1929 | Johnson | 136—207 X |
| 1,765,563 | 6/1930 | Borden et al. | 136—226 |
| 1,774,720 | 9/1930 | Mieville | 321—1.5 X |
| 2,493,651 | 1/1950 | Boelter et al. | 136—226 |
| 2,594,618 | 4/1952 | Booth, Jr. | 136—226 X |
| 2,953,745 | 9/1960 | James | 136—226 UX |
| 3,300,840 | 1/1967 | Marshall et al. | 136—226 X |
| 3,357,866 | 12/1967 | Belofsky | 136—226 X |
| 3,382,108 | 5/1968 | Wikins | 136—226 |
| 3,477,880 | 11/1969 | Gay | 136—207 |

FOREIGN PATENTS

| | | | |
|---|---|---|---|
| 508,601 | 12/1954 | Canada | 321—1.5 |
| 579,817 | 7/1959 | Canada | 136—230 |
| 1,089,781 | 11/1967 | Great Britain | 136—207 |

BENJAMIN R. PADGETT, Primary Examiner

H. E. BEHREND, Assistant Examiner

U.S. Cl. X.R.

136—207, 223, 230